US006183856B1

(12) United States Patent
Amon

(10) Patent No.: US 6,183,856 B1
(45) Date of Patent: *Feb. 6, 2001

(54) OPAQUE POLYMERIC FILMS AND PROCESSES FOR MAKING SAME

(75) Inventor: Moris Amon, Pittsford, NY (US)

(73) Assignee: Mobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/686,287

(22) Filed: Jul. 25, 1996

(51) Int. Cl.$^7$ ........................................................ B32B 3/20
(52) U.S. Cl. ...................................... 428/318.4; 428/319.9
(58) Field of Search ............................. 428/319.9, 318.4

(56) References Cited

U.S. PATENT DOCUMENTS

| | | | |
|---|---|---|---|
| 4,038,446 | * | 7/1977 | Rhoads .................................... 428/35 |
| 4,377,616 | * | 3/1983 | Ashcraft et al. ...................... 428/213 |
| 4,582,753 | | 4/1986 | Duncan .............................. 428/317.9 |
| 4,632,869 | * | 12/1986 | Park et al. .......................... 428/315.5 |
| 4,652,489 | | 3/1987 | Crass .................................... 428/337 |
| 4,701,369 | | 10/1987 | Duncan .............................. 428/313.9 |
| 4,758,462 | * | 7/1988 | Park et al. ........................... 428/213 |
| 4,767,675 | | 8/1988 | Cyr et al. .............................. 428/515 |
| 4,944,990 | * | 7/1990 | Liu et al. .............................. 428/353 |
| 5,134,173 | * | 7/1992 | Joesten et al. ........................ 521/139 |
| 5,176,954 | | 1/1993 | Keller et al. ....................... 428/317.9 |
| 5,188,777 | | 2/1993 | Joesten et al. ........................ 264/41 |
| 5,209,884 | | 5/1993 | Wood, Jr. ............................... 264/41 |
| 5,231,126 | * | 7/1993 | Shi ........................................ 524/296 |
| 5,232,756 | | 8/1993 | Chang et al. ........................... 428/40 |
| 5,264,277 | | 11/1993 | Frognet et al. .................... 428/315.5 |
| 5,376,392 | * | 12/1994 | Ikegami et al. ...................... 426/127 |
| 5,397,635 | | 3/1995 | Wood, Jr. ........................... 428/314.4 |

FOREIGN PATENT DOCUMENTS

| | | | |
|---|---|---|---|
| 632 095 | * | 1/1995 | (EP) . |
| 0 865 909 A1 | | 9/1998 | (EP) .............................. B32B/27/32 |
| 0 865 910 A1 | | 9/1998 | (EP) .............................. B32B/27/32 |
| 0 865 911 A1 | | 9/1998 | (EP) .............................. B32B/27/32 |
| 0 865 912 A1 | | 9/1998 | (EP) .............................. B32B/27/32 |
| 0 865 913 A1 | | 9/1998 | (EP) .............................. B32B/27/32 |
| 0 865 914 A1 | | 9/1998 | (EP) .............................. B32B/27/32 |
| 2-227437 | | 9/1990 | (JP) . |
| 2-311539 | | 12/1990 | (JP) . |

OTHER PUBLICATIONS

Chu et al.; "Crystal transformation and micropore formation during uniaxial drawing of beta–form polypropylene film;" Polymer; vol. 36; No. 13; 1995.*

Chu et al; "Microvoid formation process during the plastic deformation of beta–form polypropylene film;" Polymer; vol. 36; No. 13; 1995.*

* cited by examiner

Primary Examiner—Jenna Davis
(74) Attorney, Agent, or Firm—Dennis P. Santini

(57) ABSTRACT

A process for making an opaque, oriented polymeric film structure and the resultant film structures. The process comprises preparing a melt containing a crystallizable polymeric matrix material at a temperature of at least above the melting point of the polymeric matrix material and thereafter forming the melt into a sheet containing molten polymeric matrix material. The sheet containing molten material is then cooled to form a sheet containing amorphous polymeric matrix material and crystallites of the polymeric matrix material. The sheet while containing the amorphous polymeric matrix material is then formed into a film by stretching the sheet in at least one direction so as to form voids adjacent to at least some of the crystallites and thereby impart opacity to the film. Film structures made by the above process have a plurality of voids, at least some of the voids not containing a void-initiating particle and at least some of the voids being interconnected with an adjacent void in the polymeric matrix material, the number of voids being sufficient to impart a significant degree of opacity in the film structure.

11 Claims, 1 Drawing Sheet

OPAQUE POLYMERIC FILMS AND PROCESSES FOR MAKING SAME

FIELD OF THE INVENTION

The present invention relates to opaque, oriented polymeric films and to processes of making such films, and, more particularly, relates to opaque, oriented polymeric films having void structures which do not require the use of immiscible and incompatible void-initiating particles for void formation and to processes of preparing such films from polymeric materials.

BACKGROUND OF THE INVENTION

In the packaging of certain types of foodstuff products such as snack foods like potato and corn chips, cookies and the like, it is common practice to employ a polymeric packaging film for such purposes. A highly desirable property for such packaging films is opacity which protects the packaged foodstuff product from deterioration caused by exposure to light. In particular, it has been found that certain wavelengths of light up to about 450 nm cause increased spoilage in the packaged products. Even when a degree of opacity is present in the film, spoilage may occur if the film allows passage of some light. Consequently, highly opaque films are the most desirable for these purposes.

Typically, such opaque polymeric packaging films are multi-layer films which comprise an opaque, thermoplastic polymeric core layer having one or more skin layers thereon. The skin layers contribute various desirable characteristics to the packaging film such as heat sealability, improved appearance, enhanced machine handling capabilities and the like.

One type of such multilayer opaque packaging films is disclosed in U.S. Pat. No. 4,632,869 to Park et al. Disclosed therein is an opaque, biaxially oriented film structure having a polymer matrix with a strata of cavitated voids, the voids containing spherical void-initiating particles of polybutylene terephthalate. The disclosed structure may also include thermoplastic skin layers and the film can include from about 1% to 3% by weight of a pigment such as $TiO_2$ or colored oxides.

Another type of opaque packaging film is disclosed in U.S. Pat. No. 4,758,462 to Park et al. This patent also discloses an opaque, biaxially oriented film with a cavitated core layer and transparent skin layers. Colored light absorbing pigments such as carbon black or iron oxide are added to the core and/or the skins in an amount of about 2 to 12 weight % to decrease light transmission through the film.

In addition, U.S. Pat. No. 4,652,489 to Crass et al. discloses an oriented, sealable, opaque polyolefin multi-layer film with a core layer containing vacuoles or voids, a sealable surface layer, and a non-sealable surface layer which incorporates a slip agent such as a polydiorganosiloxane. Further, U.S. Pat. No. 4,944,990 to Liu et al. discloses a multi-layer heat sealable structure for packaging purposes comprising a substrate including a white opaque polyolefin film, which preferably is cavitated. A second layer is coextruded on at least one surface of the substrate, the layer including a heat sealable homopolymer, copolymer, terpolymer or blend thereof. A primer coating containing a vinylidene chloride copolymer is disposed on at least one surface of the second layer and a heat sealable layer is disposed on the primer coating. All of the above-mentioned patents are incorporated by reference herein in their entireties.

Various methods for making a core layer for such polymeric packaging films which has the desired opacity are known in the art. For example, U.S. Pat. No. 4,377,616 to Ashcraft et al. discloses an opaque biaxially oriented polymer film structure which comprises a thermoplastic polymer matrix core possessing numerous voids, a substantial number of which contain at least one spherical void-initiating particle, and transparent thermoplastic skin layers adhering to the surfaces of the core layer. In accordance with the teachings of the patent, the core layer of the film is prepared by melting a mixture of a major proportion of a film-forming polymer such as polypropylene and a minor proportion of incompatible solid filler particles such as polymer which has a higher melting point, at a temperature sufficient to melt the film-forming polymer and to disperse the incompatible particles within the film-forming polymer, extruding this mixture into a film, and then biaxially orienting the extruded film.

In the formation of the film according to the Ashcraft et al. patent, the dispersed incompatible solid filler particles provides sites for the formation of voids surrounding the particles. The resultant opacity of the extruded film results from the fact that, owing to the filler particle content and biaxial stretching, a great number of voids are created. In particular, during the stretching operation, the polymer matrix is torn open at the grain boundaries of the inorganic or organic filler particles which are incompatible with the polyolefin, such that the above indicated voids, that is, empty or unfilled spaces, are formed and the resultant voids or micro-cavities are distributed throughout the volume of the film.

It is taught that these void-initiating filler particles can be organic or inorganic so long as they are spherical in shape and are within a preferred particle size range so as to initiate the formation of a void. Examples of suitable organic particles include thermoplastic resins such as polyamides, certain polyesters such as polyethylene terephthalate and polybutylene terephthalate (hereinafter PBT), and acrylic resins. Inorganic materials suitable for the filler particles include solid or hollow preformed glass spheres, metal beads or spheres, ceramic spheres, and the like.

With this film structure containing distributed voids according to the Ashcraft et al. patent, light passing through the film is refracted or scattered at the voids and therefore imparts the opaque appearance to the film. Thus, these voids provide opacity and also give the film an attractive pearlescent sheen. The structure of the core layer imparts a much higher degree of opacity, possibly due to the effects of light scattering, than that possible from the use of an opacifying pigment alone. In addition, U.S. Pat. No. 5,134,173 to Joesten et al. discloses a method for preparation of an opaque polymeric film having a matrix of a thermoplastic polymer matrix material such as polypropylene having a stratum of voids. Positioned within each of at least a substantial number of the voids is at least one spherical void-initiating solid particle of cross-linked polystyrene, the particle being phase distinct and incompatible with the polymeric matrix material. In preparing the film, a combination of the matrix material and the cross-linked polystyrene particles dispersed therein is extruded into a film structure which is then biaxially oriented either simultaneously or sequentially. The latter two patents also are incorporated by reference herein in their entireties. Further, it is known to prepare opaque polypropylene films using non-spherical inorganic particles of calcium carbonate as the void-initiating filler.

While the above processes for producing opaque polymeric films are generally satisfactory and more than acceptable films are realized therefrom, there may be several problems or disadvantages associated with the processes. For one, the raw material costs of the void-initiating filler particles oftentimes are quite high relative to the raw material costs for the thermoplastic polymeric matrix material. For example, filler particles of PBT, a material which has found wide commercial acceptance for initiating voids in matrix materials of polyolefins such as polypropylene, are quite expensive on a weight basis as compared with the matrix material, oftentimes up to three times more costly. Furthermore, since the filler particles of materials such as PBT have a density greater than the matrix material such as polypropylene, the cost penalty per unit volume or area of the resultant film is even greater. For particles of materials other than PBT, the cost differences may be greater or less depending upon the particular material utilized.

In addition, some materials such as PBT when used as the filler particles may tend to decompose during extrusion of the film, which thereby may leave an objectionable scale or deposit on surfaces of processing equipment. In the case of the decomposition of PBT, this deposit may be manifested in the formation of an eggshell-like scale on the processing equipment. This scale occasionally breaks up, causing visual defects or breaks in the film in downstream processing. For example, it has been found that a typical line for forming white opaque film using PBT as the void-initiating particles can suffer ten or more hours of downtime per month due to these scale formation problems and resultant necessary die cleanups and the like.

SUMMARY OF THE INVENTION

Accordingly, it is a feature of the present invention to provide processes for forming thermoplastic polymeric films of high opacity for a variety of applications including use in packaging films.

It is another feature of the present invention to provide processes for forming opaque polymeric films by reducing or even eliminating the use of void initiating particles in preparing opaque polymeric films.

It is a further feature of the present invention to provide a process for forming opaque polymeric films with substantially reduced amounts of immiscible void-initiating particles so as to reduce material costs in fabricating such films.

It is yet another feature of the present invention to provide processes for forming opaque polymeric films having improved operability by reducing or even eliminating scale formation and thus reducing downtime in conducting the processes.

It is a further feature of the present invention to provide opaque polymeric films containing little or no immiscible void-initiating particles and thus utilize materials of reduced cost in the preparation of such films.

It is another feature of the present invention to provide opaque polymeric films having tear characteristics comparable to that of cellulosic papers such that the films are suitable for use in synthetic papers.

It is yet another feature of the present invention to provide opaque polymeric films which exhibit porosity and are at least somewhat gas permeable, particularly with regard to gaseous oxygen transmission and thus are suitable for various packaging and medical applications where such properties are advantageous.

It also is a feature of the present invention to provide polymeric films of high opacity adapted for use in packaging films for products such as perishable foodstuffs, particularly when such films are provided with barrier properties such as by one or more coextruded barrier skin layers over the polymeric films.

Briefly, these features, among others, are obtained by the processes of the present invention which, in one aspect, encompass a process for making an opaque, oriented polymeric film structure comprising preparing a melt containing a crystallizable polymeric matrix material at a temperature of at least about the melting point of the polymeric matrix material, forming the melt into a sheet containing molten polymeric matrix material, cooling the sheet containing molten material to form a sheet containing amorphous polymeric matrix material which contains crystallites of the polymeric matrix material, and forming the sheet while containing the amorphous polymeric matrix material into a film by stretching the sheet in at least one direction so as to form voids adjacent to at least some of the crystallites and thereby impart opacity to the film.

In another aspect, the present invention encompasses an opaque, oriented polymeric film structure comprising a film containing a thermoplastic polymeric matrix material which has a first surface and a second surface, the film having a plurality of voids, at least some of the voids not containing a void-initiating particle and at least some of the voids being interconnected with an adjacent void in the polymeric matrix material, the number of voids being sufficient to impart a significant degree of opacity in the film structure.

Other features, objects and advantages of the present invention will become apparent to those skilled in the art upon careful consideration of the remainder of the subject specification and the claims appended thereto taken together with the accompanying drawing.

DETAILED DESCRIPTION OF THE PREFERRED EMBODIMENTS

In accordance with the concepts of the present invention, processes are provided which present an attractive alternative to the existing processes for forming opaque polymeric films containing a plurality of voids in the absence of, or at least with greatly reduced amounts of, immiscible void-initiating particles of materials different than the polymeric matrix material. To achieve these results, the processes of the present invention differ significantly from conventional processes for the production of opaque polymeric films such as those discussed above with reference to the Ashcraft et al. and Joesten et al. patents. These differences are detailed below by comparison with conventional procedures for forming opaque polymeric films using the immiscible void-initiating particles of the type described previously.

In a typical conventional process according to the patent to Ashcraft et al mentioned previously in which the disclosed immiscible void-initiating particles are utilized, a molten extruded sheet formed from a polymeric matrix material containing dispersed void-initiating particles is quenched and thereby crystallized, then reheated and stretched biaxially. During the biaxial stretching, the void-initiating particles tend to be too rigid to deform during the initial stretching step in the machine direction. Since the polymeric matrix material does not adhere well to these particles, the matrix material while being stretched is pulled away from the particles, leaving a void associated with most if not all of the particles. To preserve a smooth texture and prevent cavitation at the film surface, one or more skin layers which do not contain such void-initiating particles are used to encapsulate the core layer of the voided matrix material.

Figure 1:
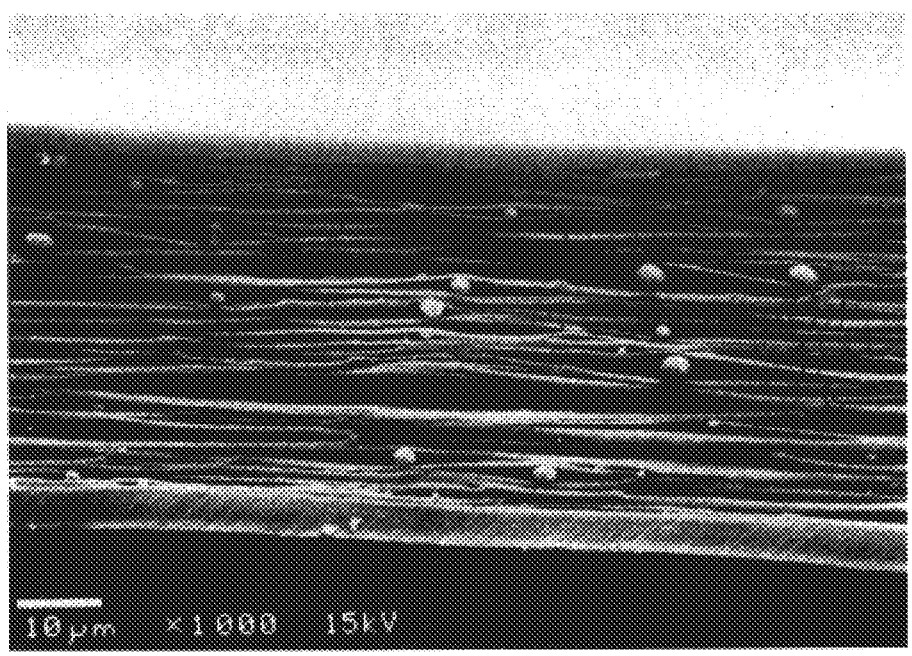
FIG. 1 is an electronphotomicrographic view of a cross-section of the structure of a opaque polymeric film produced using void-initiating particles according to the methods of the prior art, the view being at a magnification of 220 times.

The voids created in the polymeric matrix material by the use of void-initiating particles according to the above patent are illustrated in FIG. 1 which shows film 10 containing voids 12 and contained void-initiating particles 14. As is apparent, voids 12 can be characterized as being in the shape of a lens or an elongated oval. Each void 12 created is of a space having dimensions which are at least equal to or larger than the diameter of the void-initiating particle 14. Of particular significance is that most if not all voids 12 are closed cells such that there is no path open from one side of the film 10 to the other side though which liquid or gas can easily traverse. As such, the thickness of the polymeric matrix material between adjacent voids 12 is relatively large to maintain the closed cell structure.

In distinct contrast, the processes of the present invention, among other things, do not use void-initiating particles or at least utilize a reduced amount of such particles in the initial mixture containing the polymeric matrix material. Once the appropriate mixture is formulated, the mixture is melted and then extruded into a film sheet. Thereafter, the molten extruded film sheet is suitably cooled into an amorphous state. Of particular significance is that this cooling step is controlled such that the extruded sheet does not completely crystallize at this stage of the process but crystallization of the polymeric matrix material is initiated. In this condition, the cooled sheet is promptly stretched while it is in this sub-cooled amorphous state. Under these controlled thermal conditions, cavitation or void creation occurs spontaneously within the film sheet during the stretching procedure. After stretching, the resultant film is quenched so as to crystallize the polymeric film matrix as completely as possible.

Although not being bound by any particular theory, the present inventor provides the following microscopic mechanism which is presumed to occur in the subject processes, so as to aid in the understanding of the present invention. As an illustrative example of the mechanism envisioned, the matrix material used for forming the opaque film is primarily polypropylene. Polypropylene begins to melt at about 160° C. after being heated from the fully crystalline state. If the polypropylene is cooled from the molten state, appreciable crystallization does not immediately occur as the material cools down until the material reaches a "crystallization" temperature. This crystallization temperature is not a fixed temperature for a particular material, but can vary depending upon, among other things, the rate of cooling. Generally, the effective crystallization temperature for polypropylene in industrial practice where rapid cooling is employed is below about 130° C. By rapidly lowering and then controlling the temperature of the matrix material so as to be maintained in the vicinity of about 120–130° C., only small crystalline nuclei are formed in relatively small amounts while the majority of the matrix material remains in the amorphous state. In accordance with the concepts of the present invention, in the short period of time available after extrusion of the material with cooling and before the material begins to appreciably crystallize, the material then is stretched in a stretching procedure.

Upon the imposition of stresses from the stretching procedure which orient the polypropylene polymer chains of the polymeric matrix material, the temperature range at which the matrix material crystallizes is shifted substantially upward, the amount primarily being dependent on the extent of orientation. As a result, the crystallization within the matrix material suddenly accelerates tremendously. The density of the growing crystallites is higher than that of the surrounding amorphous material.

From a microscopic point of view, the matrix material adjoining a crystallite has to shrink in comparison to its previous amorphous state. In the absence of external stress, it would do so by pulling the soft matrix material with it. However, in the presence of large internal stresses from the stretching procedure, the matrix material not only cannot be pulled in towards the crystallite, but is actually pulled outwardly. Large local stresses generated by the stretching result at the crystallite-amorphous matrix material interfaces, leading to the formation and propagation of numerous cracks in the sheet which are manifested as cavities, voids or the like.

Figure 2:
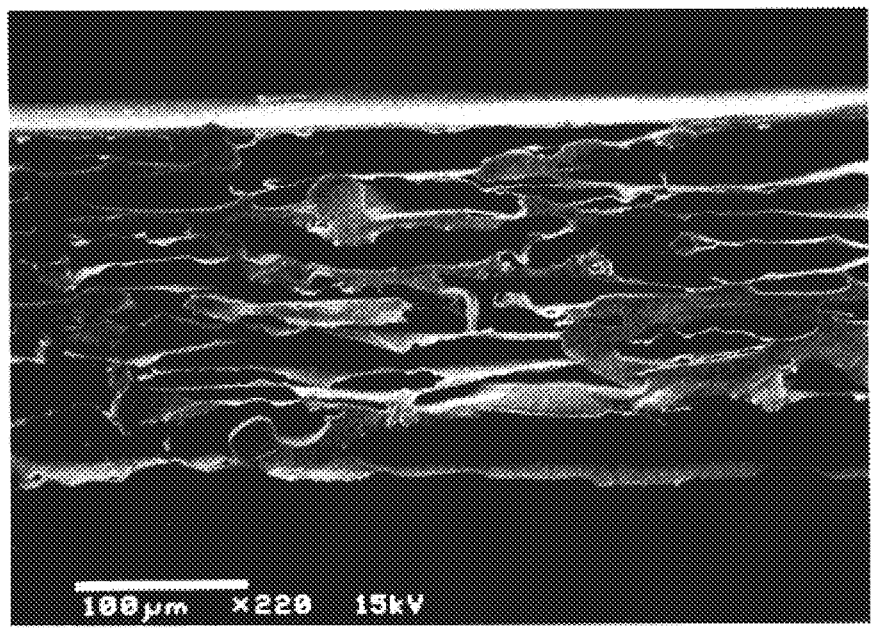
FIG. 2 is an electronphotomicrographic view at a magnification of 1000 times of a cross-section of the structure of a opaque polymeric film produced according to the methods of the present invention.

An example of such an opaque, void-containing polymeric film according to the invention is shown in FIG. 2. Film 20 of FIG. 2 contains interconnected voids 22 and no void-initiating particles within the voids. As is apparent, voids 12 can be characterized as being irregularly or randomly shaped and at least in part interconnected due to broken or ruptured walls so as to form an open-cell structure. It also can be particularly noted that many of the walls between adjacent voids 20 are extremely thin which allows transmittal of fluids from one void to an adjacent void by diffusion and thereby contributes to the permeability of the film to liquids or gases such as oxygen.

A comparison of the films shown in FIGS. 1 and 2 illustrates that the voids 22 in film 20 according to the invention are considerably larger than voids 12 of film 10 produced using void-initiating particles. In particular, it can be noted from FIG. 2 that if a line is drawn perpendicular to the surface of film 20, such a line crosses ten or fewer voids 22 whereas if a line is drawn perpendicular to the surface of film 10 of FIG. 1, the line would cross at least twenty voids 12.

In view of the above, the opaque polymeric films of the present invention may be characterized as containing numerous voids typically throughout the matrix material and thus the films have a significant degree of opacity. Contrary to the opaque films produced using immiscible and incompatible void-initiating particles of a material which is different from the polymeric matrix material and which particles are contained within the resultant voids, the opaque films of the present invention include voids which do not contain void initiating particles.

Due to the contained void structure of the opaque polymeric films according to the present invention, the film of a polyolefin such as polypropylene generally has a density of less than 0.9 g/cm$^3$, preferably less than 0.7 g/cm$^3$, and, in particular less than 0.6 g/cm$^3$. Because of the number of voids created within the polymeric matrix material, a significantly enhanced light scattering effect is obtained by virtue of the present invention.

More particularly, in forming the opaque polymeric films of the present invention, a polymeric matrix material is heated at least to a temperature at which the material becomes molten. Melting of the polymeric matrix material may be accomplished in a conventional film extruder or the like. The melt is then subjected to, for example, melt extrusion to form a molten sheet or film. Known and conventional extrusion equipment and techniques may be used for this purpose. Typically, a screw-type extruder having a screw of a L/D ratio of at least 5/1 and a flat or slot die is utilized for melting and extrusion purposes. Once the sheet is extruded, the sheet is cooled within a temperature range at which crystallization of the polymeric matrix material is initiated so that crystallites are formed within the material but the majority of the material remains in the amorphous state. Typically, crystallization of the matrix material at this stage does not exceed about 20%, preferably about 10% or less. Such controlled cooling of the molten sheet may be accomplished by a variety of means such as liquid-cooled take-off rolls, gaseous flows such as air flows and the like, as will be apparent to those of ordinary skill in the art.

In the subject processes, the formed sheet of amorphous polymeric matrix material is subjected to stretching or orientation to significantly initiate crystallization and generate voids within the matrix material. Stretching of the matrix material sheet can be accomplished in a variety of manners and can be uniaxial stretching or biaxial stretching. If used, biaxial stretching preferably is conducted sequentially, although simultaneous stretching in both machine and transverse directions is also contemplated.

The uniaxial or biaxial stretching is carried out to an extent and at a temperature calculated to obtain the maximum degree of opacity without significant sacrifice in the desired physical characteristics including appearance of the resultant film structure. As the particular materials employed in forming the polymeric matrix material are varied, the conditions and degree of orientation or stretching may be altered accordingly to achieve the desired results. Generally, a machine direction orientation of about 4 to about 8 times and a transverse direction orientation of from about 4 to about 10 times yield polyolefin film structures of satisfactory characteristics including opacity.

Certain components of conventional equipment typically utilized for orientation of polymeric films may be utilized for orientation in the processes of the present invention. For example, longitudinal or machine direction stretching or orientation may be advantageously conducted using two rolls running at different speeds according to the desired stretching ratio, and transverse stretching or orientation may be conducted using an appropriate tenter frame. It should be recognized that even so-called uniaxial stretching such as created by drawing rolls results in biaxial stresses since contraction of the sheet in the transverse direction which would normally occur is prevented by adhesion between the roll and the sheet.

After stretching and consequent formation of voids within the film, the film may be subjected to a heat treatment for thermofixing for a short period up to about 10 seconds or more. Additionally, one or both of the outer surfaces of the films of the present invention may be treated to improve their surface energy such as by, for example, film chlorination, oxidation, flame or corona discharge treatments. Such surface treatments can improve the adhesion of the films to metal layers, inks and/or other coating or laminating materials. Thereafter, the film may be then wound up in a conventional manner using a wind-up type device.

The polymeric matrix material of the opaque films of the present invention may be primarily composed of a wide variety of polymeric materials which crystallize, preferably as long as such materials meet certain criteria. In particular, suitable polymeric materials have a crystallization rate such that the material may be cooled to an amorphous state without significant crystallization in an industrial operation, but can thereafter be crystallized from the amorphous state upon stretching. In other words, the crystallization rate is neither too fast nor too slow such that the subject processes can be practiced on an industrial scale by providing sufficient time to stretch the material after crystallization is initiated, but while the majority of the polymeric material remains in the amorphous state. Polymeric materials having a crystallization rate approximating that of polypropylene are particularly suitable for the present processes. In addition, the polymeric matrix material, after being subjected to the processes of the present invention, preferably results in an opaque polymeric film which exhibits a significant degree of crystallinity such as, for example, at least about 30%, preferably at least about 50%.

Thus, the polymer of the matrix material may include one or more polyolefins alone or in conjunction with other polymeric materials which meet the above conditions. Polyolefins contemplated for inclusion in the matrix material may include polypropylene, polyethylene, polybutene and copolymers and blends thereof. Included may be distinct species of these polyolefins such as high density polyethylene, linear low density polyethylene, ultra low density polyethylene and linear low density ethylene copolymerized with less than about 10% by weight of another alpha olefin such as propylene and butylene. Also contemplated are copolymers of polyolefins including block copolymers of ethylene and propylene, other ethylene homopolymers, copolymers and terpolymers; or blends thereof. Other contemplated thermoplastic polymers include halogenated polyolefins; polyesters such as polyalkylene terephthalates including polybutylene terephthalate; polyethers; and polyamides such as nylons. Especially preferred is an isotactic polypropylene containing at least about 80% by weight of isotactic polypropylene, preferably about 97 to 100% isotactic polypropylene. It is also preferred that the polypropylene have a melt flow index of from about 1 to about 10 g/10 min.

It is further contemplated in accordance with the concepts of the present invention that the polymeric matrix material may also include other materials as long as the ability of the matrix material to form crystallites and create voids from these crystallites upon stretching while in an amorphous state is not significantly hindered. For example, the opacity of the film can be enhanced by the inclusion of from about 1 to 3% by weight of a pigment such as titanium dioxide, colored oxides and the like. While the pigment may be in a particle size such that it does not contribute in any material sense to void initiation in the polymeric matrix material, the use of pigments which contribute to void formation is not precluded. Additionally, other additives such as fillers, anti-oxidants, anti-static agents, slip agents, anti-tack agents, absorbents and the like in the customary amounts can be incorporated into the polymeric matrix material with the proviso as noted above.

The opaque thermoplastic polymeric films of the present invention may be used for a variety of purposes, either alone or in conjunction with other structures such coatings, coextruded film layers of the same or different composition, adhered film layers of the same or different composition, and the like. As a particular example, the opaque films made by subject processes may have high gas permeation rates, and in particular, high oxygen permeation rates of at least 500 cc.mil/100in$^2$/day and even up to 10,000 cc.mil/100in$^2$/day or more, such that the films can be considered to be essentially porous. Thus, the opaque polymeric films of the invention, due to their porous nature, are suitable as "breathable" films for certain packaging and medical applications where gas transmission is desirable.

The above-described porous nature of the subject films is in distinct contrast to the opaque films prepared according to the previously-mentioned patent to Ashcraft et al. using immiscible void-initiating particles as such films according to the patent have low oxygen transmission rate characteristics. The films of this patent are described as containing voids which are closed cells such that there are virtually no paths open from one side of the film to the other throughout which liquid or gas can traverse. Consequently, many of the voids of the opaque thermoplastic polymeric films according to the present invention may have openings extending between adjacent voids such that paths exist so that liquids and/or vapors can traverse from one side of the film to the other. In addition, as was previously mentioned, portions of the walls between adjacent voids may be extremely thin thus allowing diffusion of gases and vapors from one void to another further contributing to the high gas transmission rate characteristics of the subject films.

As another example of a particular application of the subject opaque, thermoplastic polymeric films, these films, because of their particular tear characteristics, may be used as synthetic papers upon the application of appropriate coatings. While polymeric films such as polypropylene films, in general, can be coated with specialized coatings such as high-clay-content coatings to produce paper substitutes having excellent printable or writable coated surfaces on the film as well as having water and humidity resistance which far exceed those of conventional cellulosic papers, these polymeric films tend to have at least two major disadvantages relative to conventional cellulosic paper.

In particular, these conventional films of polymeric materials have a very high uninitiated tear resistance as well as low initiated tear resistance. With regard to the former property, it is virtually impossible in most cases to manually start a tear in a defect-free polymeric film. However, once a tear is started with a knife, its direction is difficult to control, even if the sample was pre-creased, due to the second property of low initiated tear resistance. As such, these synthetic papers using polymeric films tend not to "feel" like paper to the user and thus commercial acceptance of these synthetic paper films has been limited.

On the other hand, the opaque polymeric films such as polypropylene films according to the present invention can be torn easily by hand from a straight, defect-free edge. In addition, with such films, the tear in the film propagates with some resistance, so that the direction of the tear can be manually controlled. Both of these properties of the subject films tend to mimic the properties of conventional paper which the consumer regards as having a "natural feel" and expects to find in at least certain applications such as use as writing paper.

As a specific example of this application for the subject films, a polypropylene film according to the present invention was prepared and compared to other types of paper, either to synthetic paper or to conventional cellulosic papers. The Table below lists Elmendorf tear test data for four such paper-like materials. In particular, two types of commercial writing paper which are sold as pads, and a white-opaque polypropylene label film formed from cavitated void-initiating particles and sold commercially by Mobil Oil Corporation were compared. In interpreting the following data, it must be understood that the Elmendorf test proceeds at an accelerating rate of motion and therefore is not entirely representative of the feel of a manual tear. The machine direction (MD) was not known in the conventional papers and was arbitrarily selected as being parallel to the long dimension of the sheets. The results for tearing in both the machine direction and for the transverse direction (TD) were as follows:

TABLE

|  | Uninitiated | | Initiated | |
| --- | --- | --- | --- | --- |
|  | MD, g/mil | TD, g/mil | MD, g/mil | TD, g/mil |
| Subject film (7 mil) | 165 | 64 | 7.1 | 4.8 |
| Mobil 140LL (2.9 mil) | >1000 | >1000 | 5.2 | 4.1 |
| Ledger paper (3.9 mil) | 256 | 144 | 12.6 | 10.2 |
| Quadrille paper (3.2 mil) | 98 | 42.7 | 9.1 | 7.4 |

From the above data, it can be observed that, in terms of uninitiated tear strength, the film according to the subject invention was within the range of conventional papers, whereas the commercial cavitated polypropylene film was not. In terms of initiated tear strength, the subject film approached that of conventional paper more than the commercial cavitated polypropylene film. As such, the opaque polymeric films of the invention exhibit characteristics making them particularly suitable for use in synthetic papers, preferably with applied coatings of the type conventionally used in making synthetic papers such as writable coatings of various clays, pigments and the like, preferably adhered by or contained within a suitable binder and/or adhesive material.

As was mentioned previously, the opaque polymeric films of the present invention also may have one or more skin layers applied to at least one major surface of the subject film, particularly when the resultant polymeric films are to be used in certain applications such as packaging materials of the type discussed previously. The skin layer(s) may be simple, economical thin encapsulating layers or they can be more elaborate heat sealable layers. The skin layer(s) may be of a thickness such that the outer surface of the skin layer(s) does not, at least substantially, manifest surface the irregularities of the film which forms the matrix or core layer and thus the appearance of film surface is improved such as by achieving a high gloss.

Thus, in some instances, in order to avoid the formation of an irregular surface as a result of the voided condition of the film, a surface or skin layer may be formed on one or both surfaces of the formed opaque thermoplastic polymeric film by co-extrusion or the like. In addition, a co-extruded layer or layers may be utilized to reduce or even eliminate the gas transmission characteristics of the opaque polymeric films of the invention. Consequently, the composite film with such skin layers can be used in those applications where gas transmission is not desirable.

This skin layer or layers can be transparent or pigmented, and can be of the same or different material as the polymeric matrix material. The different polymeric materials may be selected for particular characteristics such as, for example, heat sealability, printability, machinability and the like. When employing a surface or skin layer or layers, it is preferred that the thickness of the core layer containing the polymeric matrix material be from about 30 to 95% of the thickness of the overall composite structure. Conversely, it is preferred that the combined skin thickness of the skin layers be about 5 to about 70% of the overall composite film thickness. When desired or necessary, the skin layers can be sufficiently thick so that the outer surfaces of the composite film do not manifest any irregularities or surface projections contained on the layer of polymeric matrix material. A preferred thickness for these film structures according to the invention is from about 0.5 mil to 30 mils either with or without skin layers.

While such skin layers may be primarily composed of a variety of polymeric materials, preferably the skin layers include one or more polyolefins. Polyolefins contemplated as the material for use in forming the skin layer(s) includes polyethylene, polypropylene, polybutylene and the like. Included are distinct species of these polyolefins such as high density polyethylene, and linear low density polyethylene, ultra low density polyethylene and linear low density ethylene copolymerized with less than about 10% by weight of another alpha olefin such as propylene and butylene. Also contemplated are copolymers thereof, including block copolymers of ethylene and propylene, random copolymers of ethylene and propylene, other ethylene homopolymers, copolymers and terpolymers; or blends thereof. The homopolymer contemplated therein is formed by polymerizing the respective monomer which can be accomplished by bulk or solution polymerization, as is well known to those skilled in the art.

The copolymers contemplated herein for the skin layer(s) may be selected from those copolymers typically employed in the manufacture of multi-layered films. As will be discussed below in greater detail, a random copolymer of ethylene and propylene can be advantageously employed to form skin layer(s). A particularly preferred material for the skin layer(s) is a random copolymer of ethylene and propylene which contains less than about 10 wt. % ethylene such as 2–3 wt % ethylene.

The contemplated terpolymers which may be used for skin layers(s) are comparatively low stereoregular polymers. The terpolymers may have a melt flow rate at 446° F. ranging from about 2 to about 10 grams per 10 minutes, and preferably from about 4 to about 6 grams per 10 minutes. The crystalline melting point can range from about less than 250° F. to somewhat greater than 371° F. The terpolymers will be predominant in propylene, and with the ethylene and l-butene monomers being present in approximately from 0.3:1–1:1 mole percentage in relation to each other.

The opacity, whiteness and low light transmission of the film are further enhanced by the addition to a skin layer of $TiO_2$ in amount of from about 1% by weight up to about 12% by weight, which is added to the melt mixture of the intermediate layer before extrusion. Additionally, this layer may also contain talc. The whiteness resulting from the inclusion of $TiO_2$ provides an excellent surface for graphics. Furthermore, the whiteness allows printing of laminated or unlaminated structures without requiring white ink.

The processability and machinability of the film is enhanced by the inclusion of a small percentage of finely subdivided inorganic material in the polyolefin material used to form the skin layer(s). Such inorganic material not only can impart antiblock characteristics to the multi-layer film structure of the present invention, but also can reduce the coefficient of friction of the resultant film without imparting objectionable haze to the structure.

Contemplated finely divided inorganic materials, referred to above, include syloid, an synthetic amorphous silica gel containing primarily silica, diatomaceous earth having particles which are porous and irregularly shaped, dehydrated kaolinite which particles are thin flat platelets; and synthetic precipitated silicates which the particles are porous and irregularly shaped. Such particles generally have a particle size of 1–10 microns. As in the case of the polymeric matrix material for the subject film structures, other additives such as fillers, anti-oxidants, anti-static agents, slip agents, anti-tack agents, absorbents and the like in the customary amounts can be incorporated into the skin layer(s). Particularly preferred compositions for the skin layer(s) include those disclosed in the patents mentioned previously.

It is preferred that all layers of the multi-layer film structures of the present invention be coextruded. Thereafter, the film preferably is biaxially oriented. For example, when employing a polypropylene for the core matrix material and skin layers, the degree of machine direction orientation may be from about 4 to about 8 times and the degree of transverse orientation may be from 4 to about 10 times to yield a biaxially oriented film.

If the polymeric material forming the coextruded skin layer(s) is a material which does not form voids during the stretching procedure in the process of the present invention, such a skin layer forms a smooth, non-porous exterior surface for the multi-layer film structures. Particularly preferred thermoplastic polymeric materials for this purpose may include the previously mentioned random block copolymers of ethylene and propylene which contain less than about 10 wt % ethylene.

As an alternative to coextrusion of a skin layer(s), or in addition thereto, skin layer(s) may be formed on the polymeric matrix material by thermal means. For example, in the processes of the present invention, the exterior surface(s) of the molten polymeric matrix material can be cooled to the extent that considerable crystallization occurs prior to stretching. This surface cooling may be accomplished by contacting the molten material with a suitable cooling roll or rolls with contact residence time and the roll temperature suitable selected to only crystallize the surface(s). Consequently, no appreciable void formation would occur adjacent to and on these surfaces upon stretching and the film would thereby be provided with a smooth finish on these surface(s) which may act as a barrier layer.

A number of significant advantages are realized by the processes of the present invention for producing opaque polymeric films as compared with processes for producing such films using immiscible void-initiating particles. Among other things, the subject process significantly reduces the capital outlay for a new production line by essentially eliminating a large caster roll typically utilized, as well as many of the preheat zones utilized prior to orientation such as the preheat zone for machine direction orientation and also the preheat zone for transverse direction orientation. In addition, quenching can be accomplished simply with, for example, a flow of cold air since quenching is applied to the film after orientation or stretching is complete when, the film is thinner, typically 40 times thinner, than the original extruded sheet. Since polymeric materials are a poor thermal conductor, a thinner film can be cooled more efficiently. As a consequence, the cost and operating problems associated with a conventional water bath used for quenching purposes can be eliminated.

The following example illustrates a particular process of preparing opaque thermoplastic polymeric film structures in accordance with the concepts of the present invention. It is to be understood that the example is given for the purpose of illustration and does not limit the invention as disclosed and claimed. In the example, all parts and percentages are by weight unless otherwise specified.

EXAMPLE

In one particular application, polypropylene resin (MP=320° F., melt index=3) sold under the tradename Fina 3371 was melted in an extruder with a screw of a L/D ratio of about 20/1 and extruded into sheet form at a melt temperature of about 400° F. The surface of the molten sheet was briefly cooled over a roll containing a circulating fluid at about 200° F. to avoid the film sticking to succeeding rolls. Subsequently, the sheet was thermally conditioned over two consecutive rolls containing a circulating fluid at about 250° F. Then, a rapid 6x machine direction stretch was imposed by means of a fast roll in conjunction with a slow roll. The fast (cold) and slow (hot) rolls for conducting the machine direction stretching procedure were rubber-clad to prevent slippage of the sheet. The fast roll as well as a subsequent cooling roll contained circulating water at 50° F. It was believed that the polymeric matrix material was largely uncrystallized (except for a skin layer) up to the point of the stretch in the machine direction (MD).

The resultant MD-oriented film structure was coarsely cavitated, that is, the sheet contained coarse voids, and had a thickness of about 21 mils. The bulk density of the film structure was about 0.42 g/cc, or less than about half the density of solid polypropylene. The normalized oxygen transmission rate of this sheet was found to be 1550 cc.mil/100in$^2$/day. This transmission rate is approximately ten time higher than cavitated or uncavitated oriented polypropylene.

In a separate operation, the above MD-oriented film structure was further stretched in the transverse direction (TD). One sample of the film structure was TD-stretched by means of an Instron tensile tester with an environmental chamber maintained at about 120° F. and a second sample stretched at about 320° F. using a laboratory stretching machine sold by T. M. Long Co., Inc. For both samples, the transverse stretch ratio was about 7. Upon attempting to determine the oxygen transmission rate of the final samples, a precise value could not be measured because the value was beyond the range of available instrumentation. As such, the rate may be at least 10,000 cc.mil/100in$^2$/day as normalized for thickness and thus, in other words, the film structure was essentially porous.

In summary, the opaque films produced according to the present invention may be used with particular advantage for the manufacture of non-transparent packages for various materials such as light-sensitive foodstuffs, particularly in the form of a multi-layer film having one or more skin layers as described above. Additionally, the films may be used for other packaging purposes where non-transparent polymeric films are required. Due to the high oxygen transmission rates of the subject polymeric films, the films may be used for other packaging purposes and for medical applications where breathable films are required. Furthermore, as explained above, the film may be used as a base film for synthetic paper and the like, and additionally may be used as a base film for other purposes such as an adhesive tape or similar adhesive products.

Although the present invention has been described with reference to preferred embodiments thereof, it is to be understood that various modifications and variations may be utilized without departing from the spirit and scope of this invention as those of ordinary skill in the art will readily understand. Such modifications and variations are considered to be within the purview and scope of the present claims.

It is claimed:

1. An opaque, oriented polymeric film structure comprising a film consisting essentially of a thermoplastic polymeric matrix material, which film has a first surface and a second surface, the film having a plurality of voids, at least some of the voids not containing a void-initiating particle and at least some of the voids being interconnected with an adjacent void in the polymeric matrix material, the number of voids not containing a void-initiating particle being sufficient to impart a significant degree of opacity in the film structure, wherein said film is made by a process comprising melting and extruding said thermoplastic polymeric matrix material into a sheet, cooling said sheet to form an amorphous polymeric matrix material in which crystallization is initiated but not completed, and orienting the cooled sheet in at least one direction.

2. An opaque, oriented polymeric film structure according to claim 1, wherein the polymeric matrix material consists essentially of one or more polyolefins.

3. An opaque, oriented polymeric film structure according to claim 2, wherein the polymeric matrix material consists essentially of polypropylene.

4. An opaque, oriented polymeric film structure according to claim 2, wherein the film structure has an oxygen permeation rate of at least 500 cc.mil/100in$^2$/day.

5. An opaque, oriented polymeric film structure according to claim 4, wherein the film structure has an oxygen permeation rate of at least 500 cc.mil/100in$^2$/day.

6. An opaque, oriented polymeric film structure according to claim 1, further including a skin layer containing thermoplastic polymeric material on at least one of the first surface and the second surface of the film.

7. An opaque, oriented polymeric film structure according to claim 6, wherein the skin layer contains a polyolefin.

8. An opaque, oriented polymeric film structure according to claim 1, wherein the film structure includes at least one skin layer containing thermoplastic polymeric material on the first surface of the film and at least one skin layer containing thermoplastic polymeric material on the second surface of the film.

9. An opaque, oriented polymeric film structure according to claim 8, wherein at least one skin layer is of a thermoplastic polymeric material which, when stretched, does not generate voids.

10. An opaque film structure made by a process comprising preparing a melt consisting essentially of a crystallizable polymeric matrix material at a temperature of at least above the melting point of the polymeric matrix material, forming the melt into a sheet consisting essentially of molten polymeric matrix material, cooling the sheet to form amorphous polymeric matrix material and crystallites of the polymeric matrix material, and forming the sheet into a film by stretching the sheet in at least one direction so as to form voids adjacent to at least some of the crystallites and thereby impart opacity to the film.

11. An opaque, oriented polymeric film structure comprising a film consisting of a thermoplastic polymeric matrix material which has a first surface and a second surface, the film having a plurality of voids but being free of void-initiating particles, and at least some of the voids being interconnected with an adjacent void in the polymeric matrix material.

* * * * *